(12) United States Patent
Ono

(10) Patent No.: US 6,901,143 B1
(45) Date of Patent: May 31, 2005

(54) VOICE SWITCHING SYSTEM CAPABLE OF IMPROVING A QUALITY OF CONVERSATION

(75) Inventor: Yoshihiro Ono, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/228,894

(22) Filed: Jan. 11, 1999

(51) Int. Cl.$^7$ .......................... H04M 1/76; H04M 7/00; H04M 9/00
(52) U.S. Cl. .............. 379/414; 379/406.07; 379/406.08
(58) Field of Search ........................... 379/414, 388.05, 379/390.01, 202.01, 391, 392, 406.01–406.08, 406.16, 388.06; 370/290

(56) References Cited

U.S. PATENT DOCUMENTS

| | | | | |
|---|---|---|---|---|
| 4,507,524 A | * | 3/1985 | Yun ...................... | 379/388.06 |
| 5,058,153 A | * | 10/1991 | Carew et al. .......... | 379/392.01 |
| 5,353,348 A | * | 10/1994 | Sendyk et al. ......... | 379/406.07 |
| 5,384,843 A | * | 1/1995 | Masuda et al. ............. | 379/391 |
| 5,386,465 A | * | 1/1995 | Addeo et al. .......... | 379/202.01 |
| 5,463,618 A | * | 10/1995 | Furukawa et al. .......... | 370/290 |
| 5,787,165 A | * | 7/1998 | Lilja et al. ............. | 379/406.07 |
| 5,940,499 A | * | 8/1999 | Fujii et al. ............. | 379/388.05 |
| 6,097,971 A | * | 8/2000 | Hosoi ........................ | 455/570 |

FOREIGN PATENT DOCUMENTS

| | | |
|---|---|---|
| JP | 1-245661 | 9/1989 |
| JP | 4-22249 | 1/1992 |
| JP | 6-253001 | 9/1994 |
| KR | 1994-0000954 | 2/1994 |

OTHER PUBLICATIONS

Korean Office Action issued Feb. 27, 2001 (w/ English translations of relevant portions).

* cited by examiner

Primary Examiner—Xu Mei
Assistant Examiner—Con P. Tran
(74) Attorney, Agent, or Firm—Dickstein, Shapiro, Morin & Oshinsky, LLP.

(57) ABSTRACT

In a voice switch, a received voice signal and a transmitted voice signal are inputted to a receiving side control section, the receiving side control section thereby produces a signal for controlling an amount of attenuation in a receiving side attenuation section. As a result, the receiving side attenuation section attenuates the received voice signal by a predetermined amount to produce a speaker output voice signal for driving a speaker. A speaker output voice signal and a microphone input voice signal are inputted to a transmitting side control section, the transmitting side control section thereby produces a signal for controlling an amount of attenuation in a transmitting side attenuation section. Consequently, the transmitting side attenuation section attenuates the speaker output voice signal by a predetermined amount to produce the transmitted voice signal.

8 Claims, 8 Drawing Sheets

VOICE SWITCHING SYSTEM CAPABLE OF IMPROVING A QUALITY OF CONVERSATION

BACKGROUND OF THE INVENTION

This invention relates to a voice switching system for use in a teleconference system, a hand-free telephone system, and the like.

An example of such a voice switching system used conventionally in an electronic conference system is exemplified, as a first prior art, in unexamined Japanese Patent Publication No.Hei 1 245661, namely, 245661/1989. The publication paper discloses a howling compression device which compares a transmission signal level with a reception signal level so as to detect whether or not a difference between both levels exceeds a predetermined value. When the difference exceeds the predetermined value, the howling compression device either the transmission signal or the reception signal which is detected to be lower in level. On the other hand, the howling compression device prevents an echo canceller from amending on estimated impulse response, when the transmission signal level is detected to be higher than the reception signal level.

Another example of such a conventional voice switching system is exemplified, as a second prior art, in unexamined Japanese Patent Publication No.Hei 6-253001, namely, 263001/1994. The publication paper discloses a voice control circuit which prevents a voice system of a teleconference system from an erroneous operation due to a change of a transmitting input level dependent on an amount of echo suppression by an echo canceller. For this purpose, in the voice control circuit, from an aforehead section of an echo canceller, an input level of a transmission signal is detected by a transmitting input level detector while a reception signal level is detected by a receiving input level detector. A detection output of the transmitting input level detector is then compared with that of the receiving input level detector by the use of a comparator. Dependent on a result of the comparison, an amount of attenuation by a transmission signal attenuator or a reception signal attenuator is adjusted in the voice control circuit disclosed in the publication paper.

Still another example of such a conventional voice switching system is exemplified, as a third prior art, in unexamined Japanese Patent Publication No. Hei 4-22249, namely, 22249/1992. The publication paper discloses a loudspeaking telephone system which controls an amount of attenuation of a variable attenuator only by voices through a line in which an echo is cancelled. Namely, in the loudspeaking telephone system, an output of a microphone is attenuated by a primary variable attenuator, and then, an output of the primary variable attenuator is sent to a line. A voice received through the line is attenuated by a secondary variable attenuator to be supplied to a speaker. Thus, an amount of attenuation of the primary and the secondary variable attenuators are controlled by the received voice of which an echo is cancelled in the line.

However, all of a first, a second or a third prior art disclosed in each of the above-mentioned publication papers are such techniques as suppressing howling. As will later be described more in detail, a mismatch in timing is inevitably caused to occur between a signal to be attenuated and a reference signal for determining an amount of attenuation, when a certain delay exists in either the signal to be attenuated or the reference signal. As a result, an attenuation is inserted within a conversation at an inappropriate timing to deteriorate the quality of the conversation.

SUMMARY OF THE INVENTION

It is therefore an object of the present invention to provide a voice switching system which is capable of an appropriate switching to improve the quality of a conversation.

Other objects of the present invention will become clear as the description proceeds.

According to an aspect of the present invention, there is provided a voice switching system comprising: transmitting side attenuation section for attenuating a microphone input voice signal having a first level to produce a transmitted voice signal having a second level; receiving side attenuation section for attenuating received voice signal having a third level to produce a speaker output voice signal having a fourth level; transmitting side control section for comparing the first level of the microphone input voice signal with the fourth level of the speaker output voice signal to obtain a primary difference therebetween, the transmitting side control section controlling, dependent on the primary difference, an amount of attenuation of the microphone input voice signal in the transmitting side attenuation section; and receiving side control section for comparing the second level of the transmitted voice signal with the third level of the received voice signal to obtain a secondary difference therebetween, the receiving side control section controlling, dependent on the secondary difference, an amount of attenuation of the receiving voice signal in the receiving side attenuation section.

The receiving side control section may further comprise: a transmitting side signal delay buffer for providing the transmitting voice signal with a delay time, the delay time corresponding to a time for which the transmitted voice signal returns as the received voice signal through a communication line; a transmitting side signal power estimation section for estimating a signal power of the transmitted voice signal outputted from the transmitting side signal delay buffer; a receiving side signal power estimation section for estimating a signal power of the receiving voice signal; a first comparator for comparing a primary estimated signal power of the transmitted voice signal estimated by the transmitting side signal power estimation section with a secondary estimated signal power of the received voice signal estimated by the receiving side signal power estimation section to obtain a ratio therebetween; and a first attenuation amount calculation section for calculating an amount of attenuation in the receiving side attenuation section based on the ratio outputted from the first comparator.

The received voice signal inputted to the receiving side signal power estimation section may be silent at the initial time when the transmitted voice signal is inputted to the transmitting side signal delay buffer.

The transmitting side control section may further comprise: a microphone input power estimation section for estimating a signal power of the microphone input voice signal; a speaker output signal delay buffer for providing the speaker output voice signal with a delay time, the delay time corresponding to a time for which a voice outputted from the speaker becomes the microphone input voice signal by a sound coupling with the microphone; a first speaker output power estimation section for estimating a signal power of the speaker output voice signal outputted from the speaker output signal delay buffer; a second comparator for comparing an estimated signal power of the microphone input voice signal estimated by the microphone input power estimation section with an estimated signal power of the speaker output voice signal estimated by the first speaker output power estimation section to obtain a ratio therebetween; and a second attenuation amount calculation section for calculating an amount of attenuation in the transmitting side attenuation section based on the ratio outputted from the second comparator.

The microphone input voice signal inputted to the microphone input power estimation section may be silent at the initial time when the speaker output voice signal is inputted to the speaker output signal delay buffer.

According to another aspect of the present invention, there is providing a voice switching system of the type described, in which the transmitting side control section may further comprise: a residual echo power estimation section for estimating a signal power of a residual echo signal obtained by the microphone input voice signal passing through an acoustic echo canceller; a second speaker output power estimation section for estimating a signal power of the speaker output voice signal passing through the acoustic echo canceller; a third comparator for comparing as estimated signal power of the residual echo signal estimated by the residual echo power estimation section with an estimated signal power of the speaker output voice signal estimated by the second speaker output power estimation section to obtain a ratio therebetween; and a third attenuation amount calculation selection for calculating an amount of attenuation in the transmitting side attenuation selection based on the ratio outputted from the third comparator.

The acoustic echo canceller may sequentially renew an adaptive filter coefficient stored in an adaptive filter coefficient buffer by the use of the residual echo signal and a value of an adaptive filter tap input buffer, the residual echo signal being outputted from a subtractor to which the microphone input voice signal is inputted, and wherein sum of products between the adaptive filter coefficient of the adaptive filter coefficient buffer and the value of the adaptive filter tap input buffer is calculated is a sum of products operator, a result of the calculation being subtracted by the subtractor from the microphone input voice signal, thereby the residual echo signal being outputted.

DETAILED DESCRIPTION OF THE PREFERRED EMBODIMENTS

Figure 1:
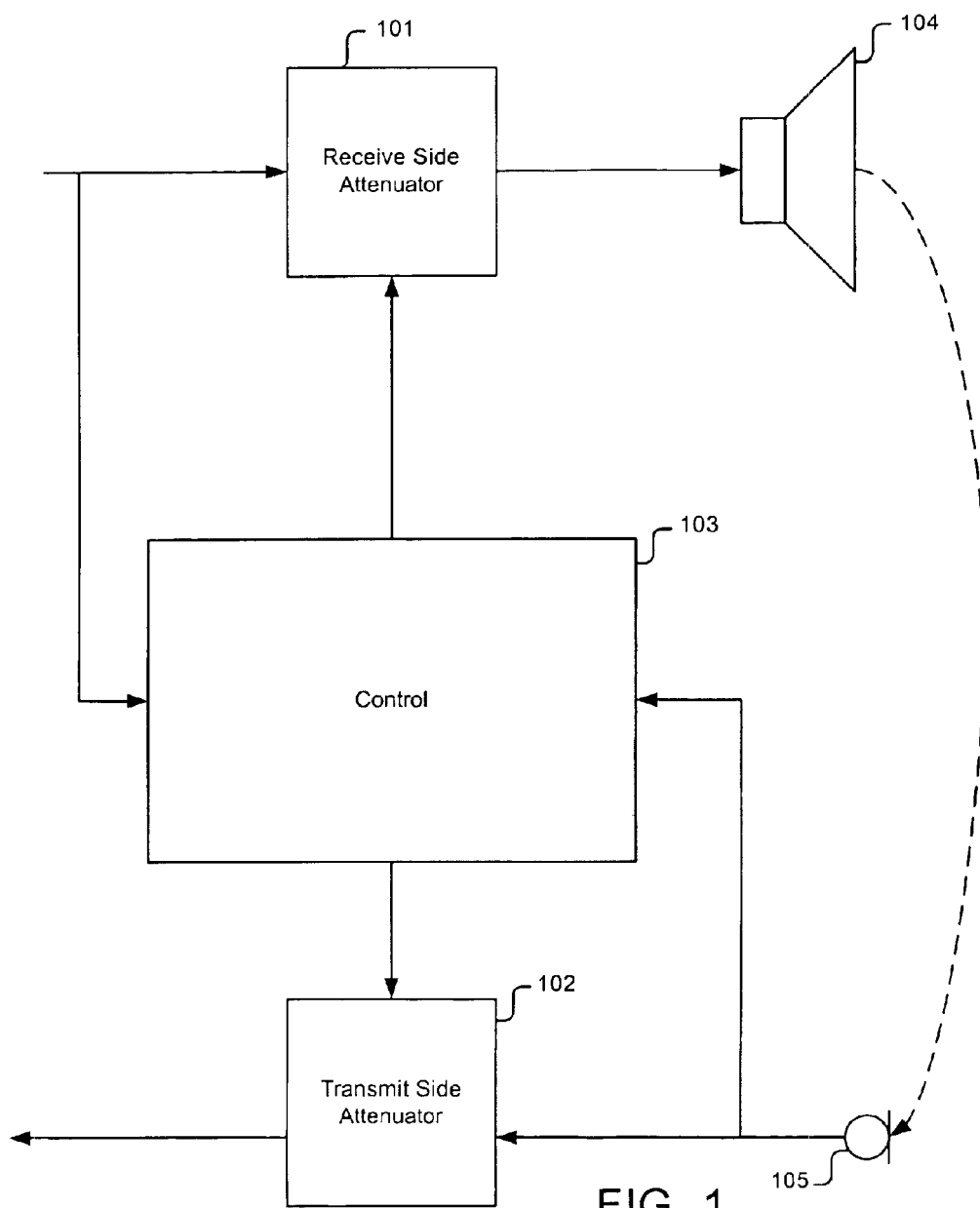
FIG. 1 is a block diagram for showing a conventional voice switching system.

Referring to FIG. 1, description is, at first made about a conventional voice switch in order to facilitate an understanding of the present invention.

FIG. 1 is a block diagram for showing a constitution of the conventional voice switch.

In FIG. 1, a receiving voice signal received from a side of a communication line is inputted into a receiving side attenuation section 101 and a control section 103. On the other hand, an input voice signal gathered by a microphone 105 is inputted into the control section 103 and a transmitting side attenuation section 102. The control section 103 controls an amount of attenuation in the receiving side attenuation section 101 and the transmitting side attenuation section 102. By this control, the receiving side attenuation section 101 attenuates the received voice signal to generate voice to be outputted from a speaker 104. The speaker 104 broadcasts the received voice all over a room. On the other hand, the transmitting side attenuation section 102 attenuates the voice signal inputted from the microphone 105 to output a transmitted voice signal to the side of the communication line.

With reference to FIG. 1 continued, description is made as regards an operation of the conventional voice switch.

In FIG. 1, the control section 103 compares a level of the received voice signal with that of the voice signal inputted from the microphone 105. As a result of the comparison, the control section 103 controls the receiving side attenuation section 101 and the transmitting side attenuation section 102 so that either the received voice signal or the input voice signal having a lower level may further be attenuated.

Herein, it is assumed that for example, a remote and speaker vocalizes, that the voice signal is received, and that no voice signal is inputted into the microphone 105. The received voice signal is broadcast over the room by the speaker 104 through the receiving side attenuation section 101. The voice signal outputted from the speaker 104 turns to the microphone 105 to be again inputted thereinto. When a gain of sound coupling of the voice signal turning to the microphone 105 from the speaker 104 is smaller than a gain of the control section 103, it is determined in the control section 103 that an input level of the transmitting side is smaller than an input level of the receiving side. The control section 103 controls the transmitting side attenuation section 102 to make an amount of attenuation larger.

Next, it is also assumed that for example, a near and speaker vocalizes, that a voice signal is inputted into the microphone 105, and that no voice signal is received. The input voice signal is transmitted through the transmitting side attenuation section 102. The voice signal thus transmitted returns as the received voice signal through a sound coupling between the speaker 104 and the microphone 105 at the remote end side. When a gain of the sound coupling between the speaker 104 and the microphone 105 is smaller than a gain of the receiving side attenuation section 101, it is determined in the control section 103 that an input level of the receiving side is smaller than an input level of the transmitting side. The control section 103 controls the receiving side attenuation section 101 to make an amount of attenuation larger.

However, in the conventional voice switch illustrated in FIG. 1, as mentioned in the preamble of the instant specification, a mismatch of timing is inevitably caused to occur between a signal to be attenuated and a reference signal to which the control section 103 refers for determining an amount of attenuation, when a certain delay exists in a communication line, for example, in a case that a processing of voice encoding is inserted therein. A certain delay is also generated while a voice outputted from a speaker return to a microphone to become an input voice of the microphone, for example, in a case that a signal buffer is inserted preceding the speaker output or following the microphone input. In this case, the mismatch of timing is also caused to occur between the signal to be attenuated and the reference signal. An attenuation is inserted within a conversation at an inappropriate timing to deteriorate the quality of the conversation.

Now, referring to FIGS. 2 through 6, description will proceed to a voice switch according to a first embodiment of the present invention.

Figure 2:
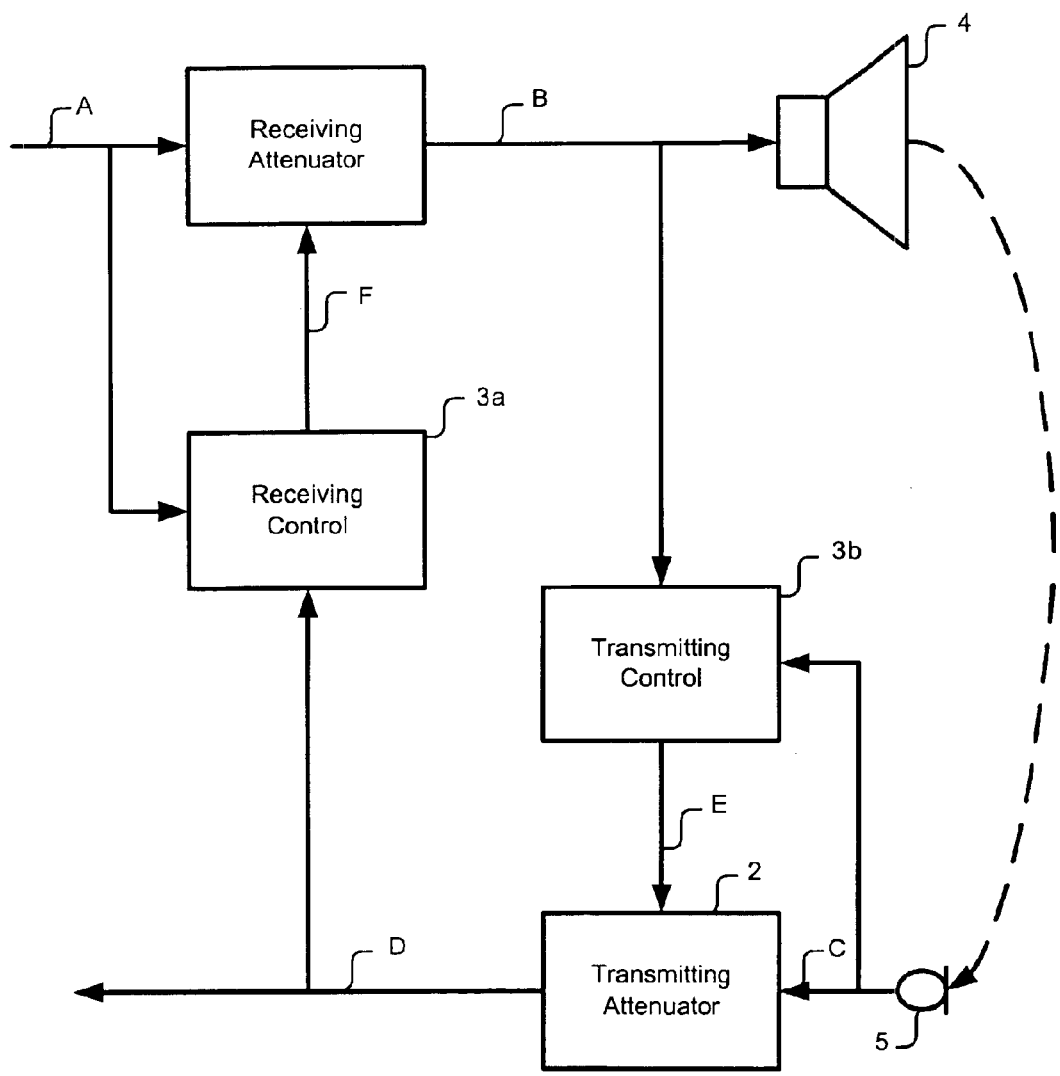
FIG. 2 is a block diagram for showing a voice switching system according to a first embodiment of the present invention.

FIG. 2 is a block diagram for showing a constitution of the voice switch according to the first embodiment.

In FIG. 2, a received voice signal A transmitted from an unillustrated communication line is inputted into a receiving side attenuation section 1 and a receiving side control section 3a. A transmitted voice signal D attenuated by a transmitting side attenuation section 2 is also inputted into the receiving side control section 3a. The transmitted voice signal D is transmitted to the unillustrated communication line.

The received voice signal A and the transmitted voice signal D are inputted into the receiving side control section 3a which compares a level of the receiving voice signal A and that of the transmitted voice signal D to detect a difference therebetween. Dependent on the difference thus detected, the receiving side control section 3a controls an amount of attenuation in the receiving side attenuation section 1. The receiving side attenuation section 1 attenuates the received voice signal A to produce a speaker output voice signal B. The speaker output voice signal B is transmitted to a speaker 4 and a transmitting side control section 3b. On the other hand, a voice spreading from the speaker 4 and a voice signal produced by a near end speaker are gathered by a microphone 5 to produce a microphone input voice signal C. The microphone input voice signal C is inputted to the transmitting side attenuation section 2 and the transmitting side control section 3b. The transmitting side control section 3b compares a level of the microphone input voice signal C and that of the speaker output voice signal B to detect a difference therebetween. Dependent on the difference thus detected, the transmitting side control section 3b controls an amount of attenuation in the transmitting side attenuation section 2. The transmitting side attenuation section 2 produces the transmitted voice signal D. Attenuated by the transmitting side attenuation section 2, the transmitted voice signal D is transmitted to the unillustrated communication line.

Figure 3:
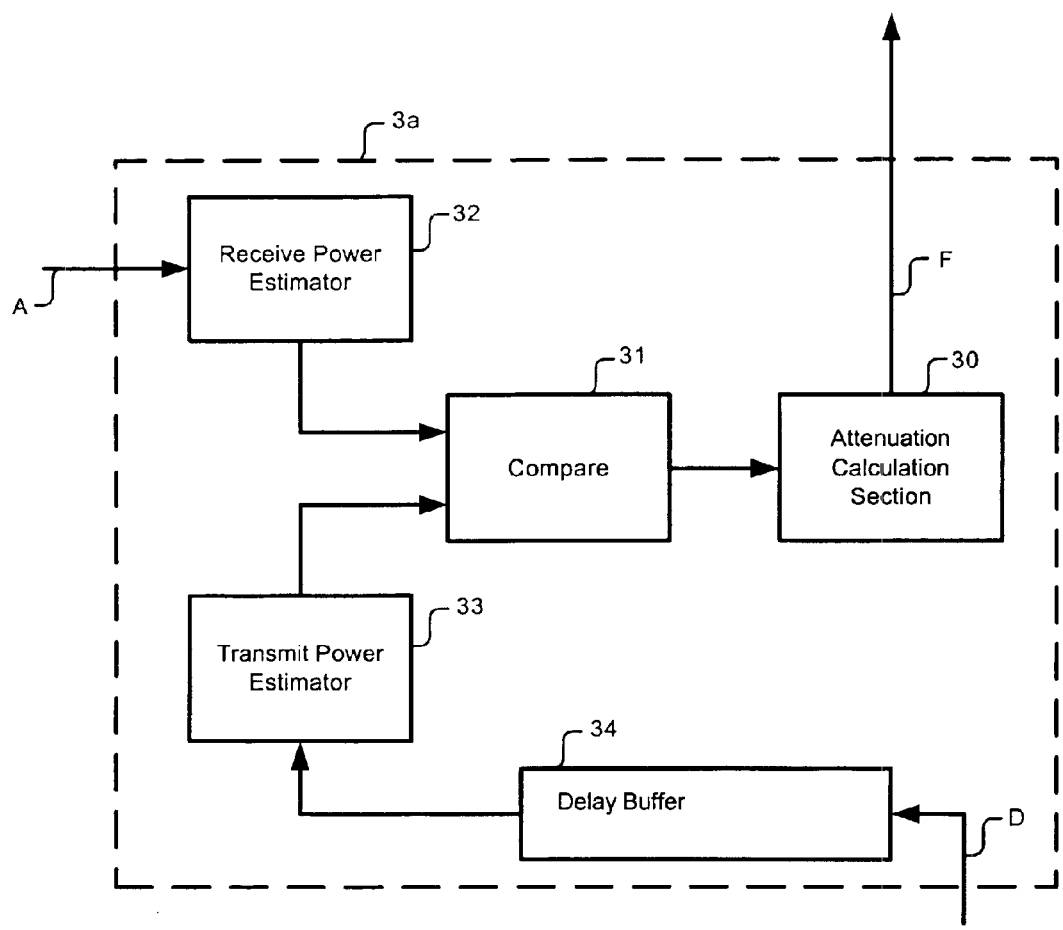
FIG. 3 is a block diagram for showing a reception side control section of the voice switching system illustrated in FIG. 2.
Figure 4:
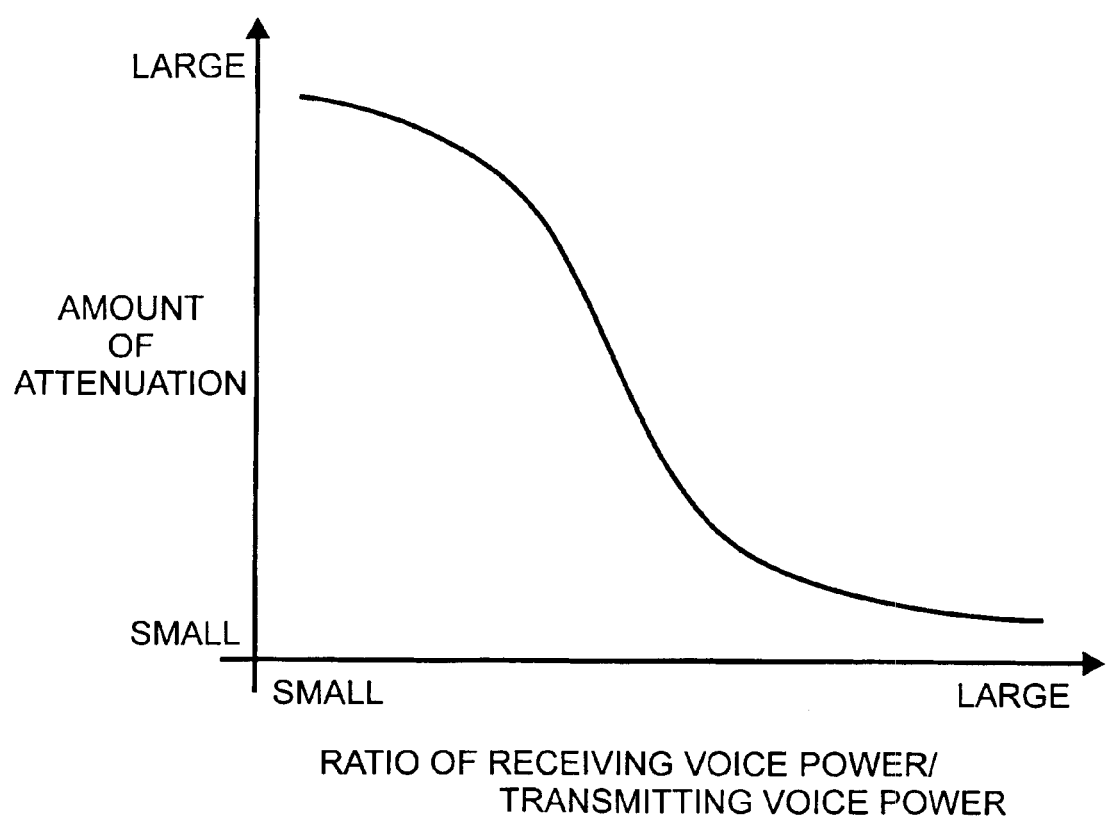
FIG. 4 is a characteristic diagram for showing a relation between a specific amount of attenuation of a reception voice power and that of a transmission voice power in an attenuation amount calculating section of the reception side control section illustrated in FIG. 3.

Next, referring to FIGS. 3 and 4, detailed description is made of the receiving side control section 3a illustrated in FIG. 2.

FIG. 3 is a block diagram for showing an internal constitution of the receiving side control section 3a.

In FIG. 3, the received voice signal A is inputted to a receiving side signal power estimation section 32. On the other hand, the transmitted voice signal D is inputted to a transmitting side signal delay buffer 34. An output of the transmitting side signal delay buffer 34 is inputted to a transmitting side signal power estimation section 33. An output of the receiving side signal power estimation section 32 and an output of the transmitting side signal power estimation section 33 are both inputted to a comparator 31 to be compared with each other. An output of the comparator 31 is inputted to an attenuation amount calculation section 30. The attenuation amount calculation section 30 outputs a receiving side attenuation amount F. The receiving side attenuation amount F is inputted to the receiving side attenuation section 1 illustrated in FIG. 2.

The receiving side signal power estimation section 32 estimates a voice signal power of the voice signal A which is received through the unillustrated communication line (lefthand side of FIG. 2) and which is produced by a remote end speaker. The receiving side signal power estimation section 32 outputs the estimated voice signal power to the comparator 31. The transmitting side signal power estimation section 33 estimates a voice signal power of the transmitted voice signal D which is delayed through the transmitting side signal delay buffer 34. The transmitting side signal power estimation section 33 outputs the estimated voice signal power to the comparator 31.

The comparator 31 compares the estimated voice signal power outputted from the receiving side signal power estimation section 32 with the estimated voice signal power outputted from the transmitting side signal power estimation section 33 to detect a ratio between the both estimated voice signal power. The ratio thus detected is outputted to the attenuation amount calculation section 30. The attenuation amount calculation section 30 calculates and produces a receiving side attenuation amount based on the ratio of the two voice signal powers outputted from the comparator 31.

A relation between the ratio and an output of the attenuation amount calculation section 30 is, for example, shown by a graph in FIG. 4. FIG. 4 shows the graph in which the ratio is depicted in a quadrature axis while the amount of attenuation is depicted in an axis of ordinates. As clearly shown in FIG. 4, the amount of attenuation becomes larger when the ratio is small. On the contrary, the amount of attenuation becomes small when the ratio is large.

Figure 5:
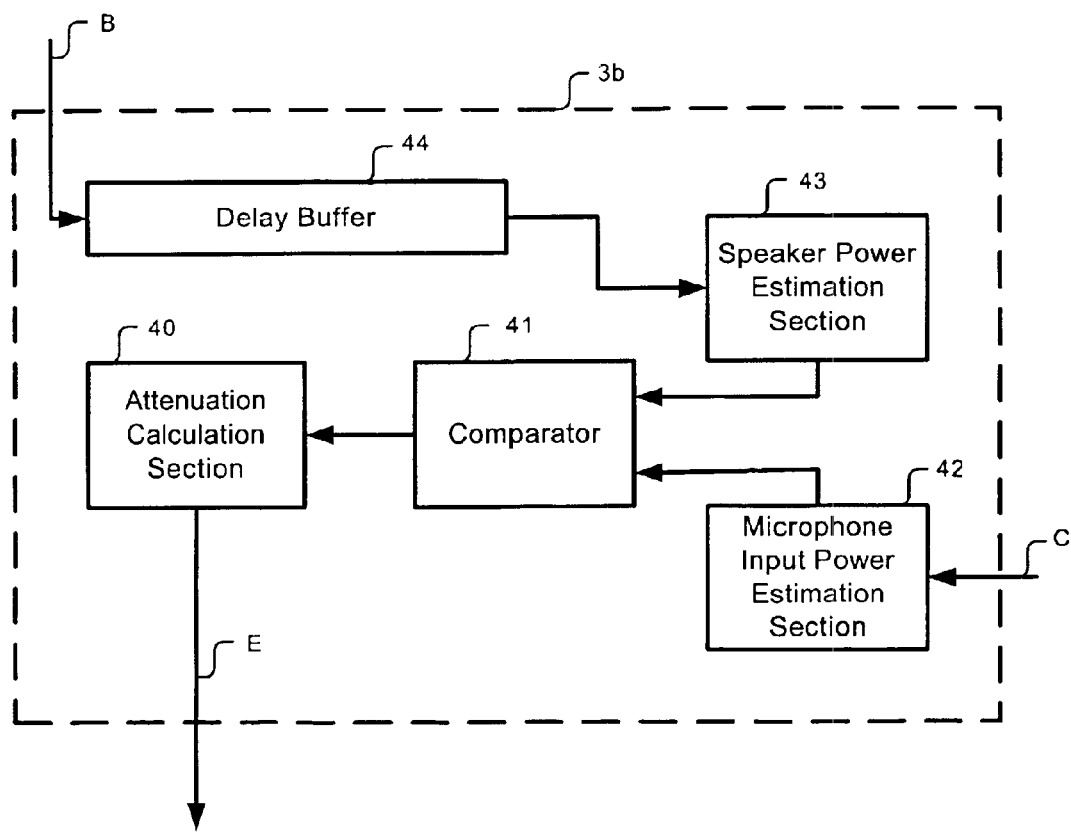
FIG. 5 is a block diagram for showing a transmission side control section of the voice switching system illustrated in FIG. 2.
Figure 6:
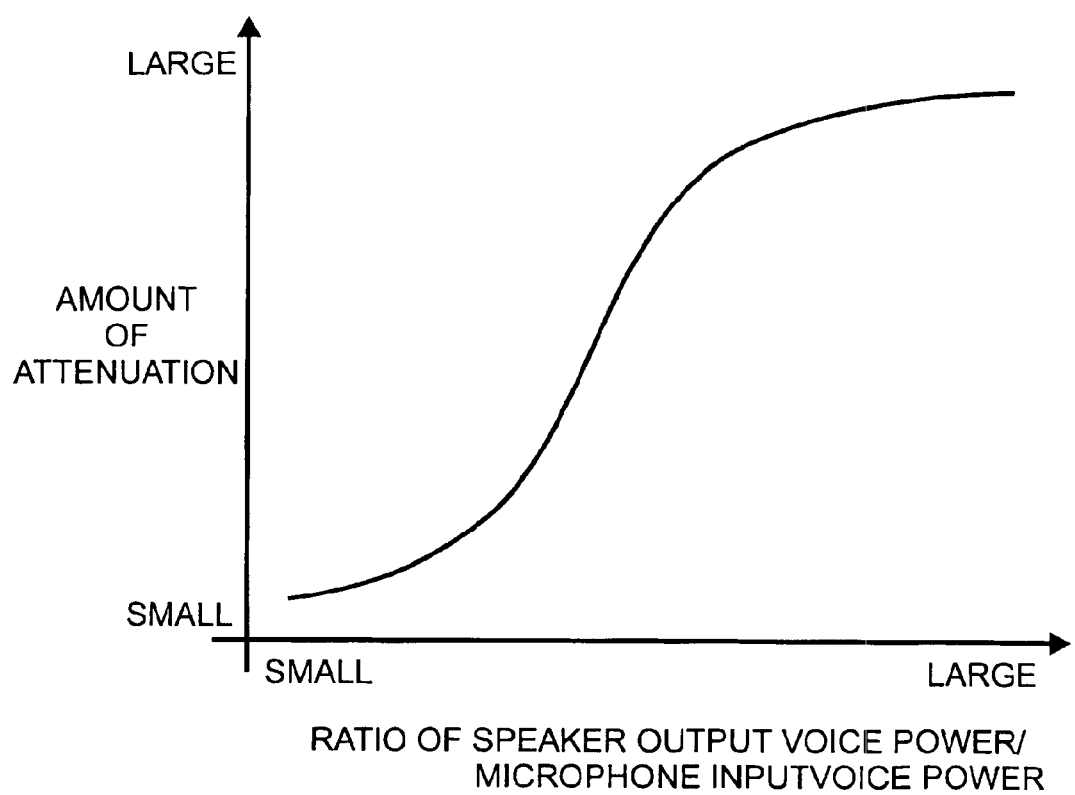
FIG. 6 is a characteristic diagram for showing a relation between a specific amount of attenuation of a speaker output voice power and that of a microphone input voice power in the transmission side control section illustrated in FIG. 6.

Further, referring to FIGS. 5 and 6, detailed description is made as regards the transmitting side control section 3b illustrated in FIG. 2.

FIG. 6 is a block diagram for showing an internal constitution of the transmitting side control section 3b.

In FIG. 6, the speaker output voice signal B outputted from the receiving side attenuation section 1 in FIG. 2 is inputted to a speaker output signal delay buffer 44. The speaker output signal delay buffer 44 delays the speaker output voice signal B to be outputted to a speaker output power estimation section 43. The speaker output power estimation section 43 estimates a power of the speaker output voice signal B delayed by the speaker output signal delay buffer 44. The estimated power is outputted from the speaker output power estimation section 43 to the comparator 41. On the other hand, a microphone input voice signal C inputted from the microphone 5 illustrated in FIG. 2 is inputted to the microphone input power estimation section 42. The microphone input phase estimation section 42 estimates a voice signal power which is corresponding to the speaker 4 and the microphone 5 illustrated in FIG. 2 and which is produced by a near end speaker. The microphone input power estimation section 42 outputs the estimated voice signal power to the comparator 41. The comparator 41 compares the estimated voice signal power of the speaker output voice signal B outputted from the speaker output power estimation section 43 with the estimated voice signal power produced by the near end speaker outputted from the microphone input power estimation section 42 to detect a ratio between the two estimated voice signal powers. The ratio thus detected is outputted to the attenuation amount calculation section 40. The attenuation amount calculation section 40 calculates and produces a transmitting side attenuation amount based on the ratio of the two voice signal powers outputted from the comparator 41. The transmitting side attenuation amount is outputted to the transmitting side attenuation section 2 illustrated in FIG. 2.

A relation between the ratio and an output of the attenuation amount calculation section 40 is, for example, shown by a graph in FIG. 6. FIG. 6 shows the graph in which the ratio is depicted in a quadrature axis while the amount of attenuation is depicted in an axis of ordinates. As clearly shown in FIG. 6, the amount of attenuation becomes small when the ratio is small. On the contrary, the amount of attenuation becomes large when the ratio is large.

With reference to FIGS. 2, 3 and 5 continued, description is made regarding an operation of the voice switch according to the first embodiment of the present invention. First, a control of the receiving side attenuation section 1 is hereinunder described. Herein, it is assumed that the microphone input voice signal C gathered by the microphone 5 and outputted therefrom exists, and that the received voice signal A transmitted through the communication line does not exist, namely is silent. In this time, the microphone input voice signal C is inputted to the transmitting side control section 3b and the transmitting side attenuation section 2. Since the speaker output voice signal B is not inputted to the transmitting side control section 3b from the receiving side attenuation section 1, the transmitting side control section 3b outputs a small amount of transmitting side attenuation to the transmitting side attenuation section 2. As a result, the transmitting side attenuation section 2 scarcely attenuates any microphone input voice signal C but outputs the transmitted voice signal D in the communication line as a transmission signal. The transmitted voice signal D outputted to the communication line is subjected to a sound coupling with an unillustrated speaker and an unillustrated microphone at the remote and side. The transmitted voice signal D is returned as the received voice signal A through the communication line. In this case, it takes about several hundreds of milliseconds for the transmitted voice signal D to be returned as the received voice signal A through the communication line.

This returned received voice signal A is inputted to the receiving side attenuation section 1 and the received side control section 3a. In the receiving side control section 3a illustrated in FIG. 3, the receiving voice signal A is inputted to a receiving side signal power estimation section 32. The receiving side signal power estimation section 32 estimates a signal power of the receiving voice signal A. Thus estimated signal power of the receiving voice signal A is outputted to the comparator 31. On the other hand, the transmitted voice signal D outputted from the transmitting side attenuation section 2 in FIG. 2 is inputted to the transmitting side signal delay buffer 34 of the receiving side control section 3a to be delayed therein. The delayed transmitted voice signal D is thereafter outputted to the transmitting side signal power estimation section 33. The transmitting side signal power estimation section 33 estimates a signal power of the transmitting voice signal D. The estimated signal power of the transmitted voice signal D is outputted to the comparator 31.

Accordingly, the comparator 31 compares a signal power of the receiving voice signal A and that of the transmitted voice signal D. In this comparison by the comparator 31, the delayed amount of the transmitted voice signal D by the transmitting side signal delay buffer 34 is adjusted to be equal to a delayed amount due to the communication line. In other words, the delayed amount of the transmitted voice signal D by the transmitting side signal time delay buffer 34 is adjusted to be equal to the delayed (In this example, several hundreds of milliseconds, as mentioned above) until the transmitted voice signal is subjected to sound coupling by the speaker and the microphone with a voice produced by a remote end speaker through the communication line and again returned as the received voice signal A through the communication line. When a gain of the sound coupling does not exceed "1", the comparator 31 outputs such a signal as increasing an amount of attenuation to the attenuation amount calculation section 30. The attenuation amount calculation section 30 outputs a large amount of the receiving side attenuation F based on the output by the comparator 31, namely, based on a ratio between the signal powers of the received voice signal A and the transmitted voice signal D. The majority of receiving side attenuation F is outputted to the receiving side attenuation section 1 in FIG. 2. Therefore, the speaker output voice signal B outputted from the receiving side attenuation section 1 is never outputted as the receiving voice signal A which corresponds to the transmitted voice signal D returned through the communication line. As a result, any voice of the receiving voice signal A is not outputted from the speaker 4.

Next, a control of the transmitting side attenuation section 2 is hereinunder described. Herein, it is assumed that the receiving voice signal A is inputted to the receiving side control section 3a through the communication line in FIG. 2, and that the microphone input voice signal C inputted through the microphone 5 is silent. In this case, the receiving side control section 3a requests a small amount of attenuation to the receiving side attenuation section 1. Consequently, any received voice signal A is scarcely attenuated by the receiving side attenuation section 1 and is outputted therefrom to the speaker 4 and the transmitting side control section 3b as the speaker output voice signal B. The speaker output voice signal B supplied to the speaker 4 from the receiving side attenuation section 1 drives the speaker 4 to produce a voice. Through a sound coupling between the speaker 4 and the microphone 5, the voice turns from the speaker 4 to the microphone 5 as depicted by a dotted line in FIG. 2 to become a microphone input. From the production of the voice to the sound coupling by which the voice is gathered with the microphone 5, delay is inevitably caused to occur. On the other hand, the speaker output voice signal B is inputted to the transmitting side control section 3b illustrated in FIG. 5. The speaker output voice signal B is therein delayed by the speaker output signal delay buffer 44 to be inputted to the speaker output power estimation section 43. An amount of delay of the speaker output signal delay buffer 44 is adjusted to be equal to a delay time until the speaker output voice signal B is outputted from the speaker 4 as a voice and is gathered by the microphone 5 to be outputted as the microphone input voice signal C with a sound coupling between the speaker and the microphone.

After being delayed by the speaker output signal delay buffer 44, the speaker output voice signal B is inputted to the speaker output power estimation section 43, as mentioned above. Therein, a signal power of the speaker output voice signal B is estimated. As a result, the estimated signal power of the speaker output voice signal B is inputted to the comparator 41. On the other hand, the microphone input voice signal C outputted from the microphone 6 is inputted to the microphone input power estimation section 42.

Therein, a signal power of the microphone input voice signal C is estimated. As a result, the estimated signal power of the microphone input voice signal C is inputted to the comparator 41. Accordingly, the comparator 41 compares the estimated signal power of the speaker output voice signal B with the estimated signal power of the microphone input voice signal C.

In this comparison by the comparator 41, when a gain of the sound coupling between the speaker 4 and the microphone 5 does not exceed "1", the comparator 41 outputs such a signal as increasing an amount of attenuation to the attenuation amount calculation section 40. Based on the result of the comparison by the comparator 41, the attenuation amount calculation section 40 calculates a transmitting side attenuation amount E to be outputted to the transmitting side attenuation section 2. Accordingly, the transmitting side attenuation section 2 largely attenuates the microphone input voice signal C with reference to the transmitting side attenuation amount E. Therefore, even if a voice outputted from the speaker 4 returns to the microphone 5 and is gathered thereby, the voice is largely attenuated by the transmitting side attenuation section E. As a result, the microphone input voice signal C is never included in the transmitting voice signal D. Thus, in the voice switch according to the first embodiment, even if delay is generated in a communication line or delay is effected until a voice outputted from the speaker 4 returns to the microphone 5 to become a microphone input, the receiving side control section 3a and the transmitting side control section 3b are capable of adequate switching operations, respectively. Accordingly, the quality of conversation is improved.

Figure 7:
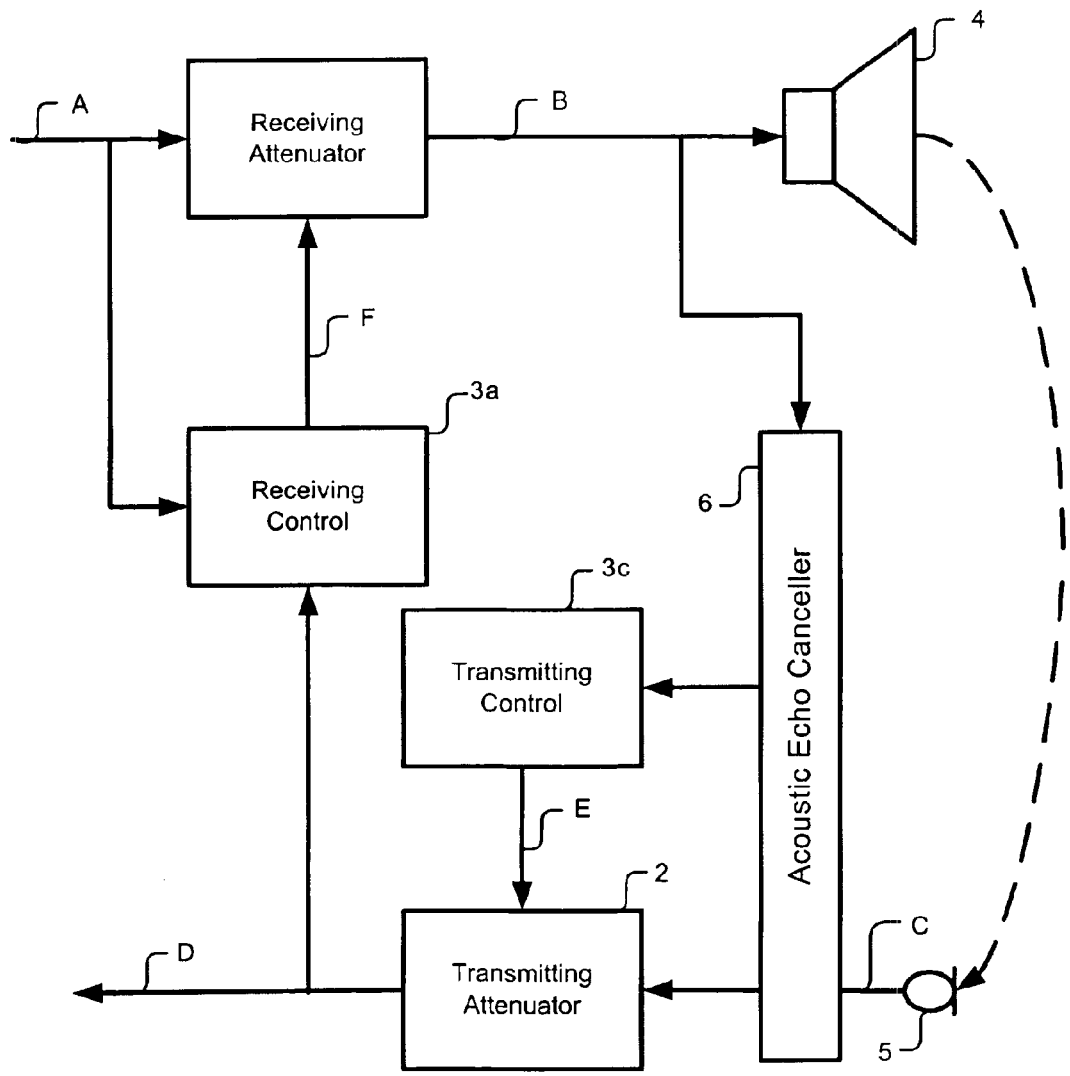
FIG. 7 is a block diagram for showing a voice switching system according to a second embodiment of the present invention.
Figure 8:
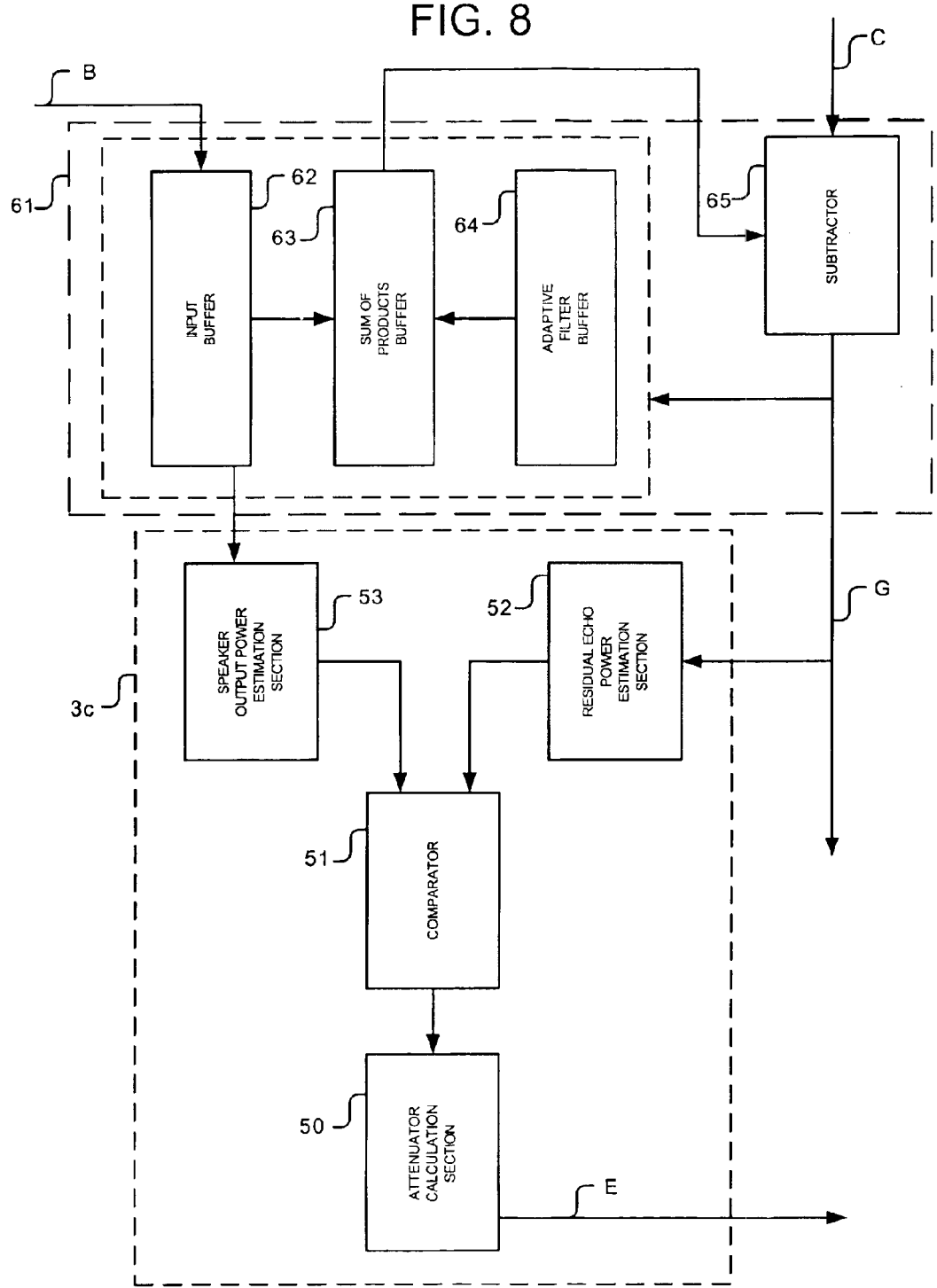
FIG. 8 is a block diagram for partially showing an acoustic echo canceller and a transmission side control section of the voice switching system illustrated in FIG. 7.

Referring to FIGS. 7 and 8, description will proceed to a voice switch according to a second embodiment of the present invention.

FIG. 7 is a block diagram for showing a constitution of the voice switch according to the second embodiment.

As illustrated in FIG. 7, the voice switch according to the second embodiment has a structure similar to that of the first embodiment. Similar portions are designated by like reference numerals.

As ill be clearly understood by comparing FIG. 7 with FIG. 2, the transmitting side control section in FIG. 7 is labeled 3c rather than 3b as in FIG. 2. Moreover, an acoustic echo canceller 6 is further provided in addition to the elements found in FIG. 2. A control of the transmitting side control section 3c is related to the acoustic echo canceller 6.

Namely, the speaker output voice signal B outputted from the receiving side attenuation section 1 is not only outputted to the speaker 4 but also inputted to the transmitting side control section 3a through the acoustic echo canceller 6. On the other hand, the microphone input voice signal C outputting from the microphone 5 is also inputted to the acoustic echo canceller 6 to be outputted therefrom as a residual echo signal G. The residual echo signal G is supplied to both the transmitting side attenuation section 2 and the transmitting side control section 3c. Other portions are similar to those of the first embodiment illustrated in FIG. 2.

Referring to FIG. 8 with reference to FIG. 7 continued, description is made as to the acoustic echo canceller 6 and the transmitting side control section 3c. FIG. 8 is a block diagram for showing the internal constitutions of the acoustic echo canceller 6 and the transmitting side control section 3c.

As illustrated in FIG. 8, the transmitting side control section 3c comprises an attenuation amount calculation section 50, a comparator 51, a residual echo power estimation section 52, and a speaker output power estimation section 53. On the other hand, the acoustic echo canceller 6 comprises an adaptive filter 61 and a subtractor 65. The adaptive filter 61 comprises an adaptive filter tap input buffer 62, sum of products operator 63 and an adaptive filter coefficient buffer 64. The above-mentioned microphone input voice signal C outputted from the microphone 5 is inputted to the subtractor 65. Further, an output of the sum of products operator 63 is also inputted to the subtractor 65.

As shown in FIG. 8, the residual echo signal 6 is outputted not only to the residual echo power estimation section 62 in the transmitting side control section 3c but also to the adaptive filter 61 in the acoustic echo canceller 6. The speaker output voice signal B outputted from the transmitting side attenuation section 1 illustrated in FIG. 7 is inputted to the adaptive filter tap input buffer 62. An output of the adaptive filter tap input buffer 62 is inputted to the speaker output power estimation section 63.

The adaptive filter 61 sequentially renews an adaptive filter coefficient stored in the adaptive filter coefficient buffer 64 by the use of the residual echo signal G and a value of the adaptive filter tap input buffer 62. The sum of products between the adaptive filter coefficient of the adaptive filter coefficient buffer 64 and the value of the adaptive filter tap input buffer 62 is calculated in the sum of products operator 63. A result of the calculation is outputted to a subtractor 65. The subtractor 65 subtracts the result of the calculation in the sum of products operator 63 from the microphone input voice signal C to produce the residual echo signal G. The speaker output power estimation section 53 estimates a signal power of the speaker output voice signal B. The estimated signal power of the speaker output voice signal B is outputted to the comparator 61. The residual echo signal G is inputted to the residual echo power estimation section 62 in the transmitting side control section 3c. The comparator 51 compares a signal power of the speaker output voice signal 8 with a signal power of a voice of a near end speaker outputted from the residual echo power estimation section 62 to detect a ratio therebetween. The ratio is outputted from the comparator 61 to the attenuation amount calculating section 50. The attenuation amount calculation section 50 calculates and decides an amount of transmitting side attenuation based on the ratio inputted from the comparator 51. The amount of transmitting side attenuation is outputted to the transmitting side attenuation section 2 in FIG. 7.

In the second embodiment, the adaptive filter tap input buffer 62 in FIG. 8 functions similarly to the speaker output signal delay buffer 44 in the first embodiment. Accordingly, the speaker output signal delay buffer 44 in the first embodiment can be replaced with the adaptive filter tap input buffer 62. With this structure, in which the voice switch of the present invention is used together with the acoustic echo canceller 6, the speaker output signal delay buffer required for delaying the speaker output voice signal can be omitted. Further, with reference to a result of study of factors in the adaptive filter 61, an amount of delay of the speaker output voice signal B can be controlled.

As described above, according to the present invention, a level of the speaker output voice signal and a level of the microphone input voice signal are compared with each other in the transmitting side control section. Dependent on a difference between the two levels, the level of the microphone input voice signal is attenuated to obtain the transmitted voice signal. Further, a level of the received voice signal and a level of the transmitted voice signal are compared with each other in the receiving side control section. Dependent on a difference between the two levels, the level of the received voice signal is attenuated to obtain the speaker output voice signal. Therefore, even if a delay is effected until a voice outputted from the speaker returns to the microphone to become the microphone input voice signal, or even if a delay exists in the side of a communication line, switching operations can be carried out adequately. Accordingly, the quality of conversation can be further improved.

While the present invention has thus far been described in conjunction with only a preferred embodiment thereof, it will now be readily possible for one skilled in the art to put the present invention into effect in various other manners.

What is claimed is:

1. A voice switching system comprising:

a transmitting side attenuation section for attenuating a microphone input voice signal having a first level to produce a transmitted voice signal having a second level;

a receiving side attenuation section for attenuating a received voice signal having a third level to produce a speaker output voice signal having a fourth level;

a transmitting side control section for comparing said first level of said microphone input voice signal with said fourth level of said speaker output voice signal to obtain a first difference therebetween, said transmitting side control section controlling, dependent on said first difference, an amount of attenuation of said microphone input voice signal in said transmitting side attenuation section; and a receiving side control section distinct from the transmitting side control section and for comparing said second level of said transmitted voice of signal with said third level of said received voice signal to obtain a second difference therebetween, said receiving side control section controlling, dependent on said second difference, an amount of attenuation of said received voice signal in said receiving side attenuation means, the receiving side control section further comprising:

a transmitting side signal delay buffer for providing said transmitted voice signal with a delay time, said delay time corresponding to a time for which said transmitted voice signal returns as said received voice signal through a communication line;

a transmitting side signal power estimation section for estimating a signal power of said transmitted voice signal outputted from said transmitting side signal delay buffer;

a receiving side signal power estimation section for estimating a signal power of said received voice signal;

a comparator for comparing said estimated signal power of said transmitted voice signal estimated by said transmitting side signal power estimation section with said estimated signal power of said received voice signal estimated by said receiving side signal power estimation section to obtain a ratio therebetween; and a first attenuation amount calculation section for calculating an amount of attenuation in said receiving side attenuation section based on said ratio outputted from said first comparator.

2. A voice switching system as claimed in claim 1, wherein said receiving voice signal inputted to said receiving side signal power estimation section is silent at the initial time when said transmitted voice signal is inputted to said transmitting side signal delay buffer.

3. A voice switching system comprising:

a transmitting side attenuation section for attenuating a microphone input voice signal having a first level to produce a transmitted voice signal having a second level;

a receiving side attenuation section for attenuating a received voice signal having a third level to produce a speaker output voice signal having a fourth level;

a transmitting side control section for comparing said first level of said microphone input voice signal with said fourth level of said speaker output voice signal to obtain a first difference therebetween, said transmitting side control section controlling, dependent on said first difference, an amount of attenuation of said microphone input voice signal in said transmitting side attenuation section; and a receiving side control section distinct from the transmitting side control section and for comparing said second level of said transmitted voice of signal with said third level of said received voice signal to obtain a second difference therebetween, said receiving side control section controlling, dependent on said second difference, an amount of attenuation of said received voice signal in said receiving side attenuation means, the receiving side control section further comprising:

a microphone input power estimation section for estimating a signal power of said microphone input voice signal;

a speaker output signal delay buffer for providing said speaker output voice signal with a delay time, said delay time corresponding to a time for which a voice outputted from said speaker becomes said microphone input voice signal by a sound coupling with said microphone;

a first speaker output power estimation section for estimating a signal power of said speaker output voice signal outputted from said speaker output signal delay buffer;

a comparator for comparing an estimated signal power of aid microphone input voice signal estimated by said microphone input power estimation section with an estimated signal power of said speaker output voice signal estimated by said first speaker output power estimation section to obtain a ratio therebetween; and an attenuation amount calculation section for calculating an amount of attenuation in said transmitting side attenuation section based on said ratio outputted from said second comparator.

4. A voice switching system as claimed in claim 3, wherein said microphone input voice signal inputted to said microphone input power estimation section is silent at the initial time when said speaker output voice signal is inputted to said speaker output signal delay buffer.

5. A voice switching system as claimed in claim 3, said transmitting side control means further comprising:

a residual echo power estimation section for estimating a signal power of residual echo signal obtained by said microphone input voice signal passing through an acoustic echo canceller;

a second speaker output power estimation section for estimating a signal power of said speaker power of said speaker output voice signal passing through said acoustic echo canceller;

a third comparator for comparing an estimated signal power of said residual echo signal estimated by said residual echo power estimation section with an estimated signal power of said speaker output voice signal estimated by said second speaker output power estimation section to obtain a ratio therebetween; and a third attenuation amount calculation section for calculating an amount of attenuation in said transmitting side attenuation section based on said ratio outputted from said third comparator.

6. A voice switching system as claimed in claim 5, wherein said acoustic echo canceller sequentially renews an adaptive filter coefficient stored in an adaptive filter coefficient buffer by the use of said residual echo signal and a value of an adaptive filter tap input buffer, said residual echo signal being outputted from a subtractor to which said microphone input voice signal is inputted, and wherein a sum of products between said adaptive filter coefficient of said adaptive filter coefficient buffer and said value of said adaptive filter tap input buffer is calculated in a sum of products operator, a result of the calculation being subtracted by said subtractor from said microphone input voice signal, thereby said residual echo signal being outputted.

7. A voice switching system comprising:

a first receiver which receives a first voice signal;

a first attenuation circuit which receives the first voice signal from the first receiver and produces a first attenuated signal;

a first control circuit coupled to the first attenuation circuit;

a second receiver which receives a second voice signal;

a second attenuation circuit which receives the second voice signal from the second receiver and produces a second attenuated signal; and a second control circuit distinct from the first control circuit and coupled to the second attenuation circuit; wherein the first control circuit receives the first voice signal and the second attenuated signal, the first control circuit compares the first voice signal and the second attenuated signal and produces a first attenuation control signal in response thereto, the first attenuation control signal controls an attenuation of the first attenuation circuit; and the second control circuit receives the second voice signal and the first attenuated signal, the second control circuit compares the second voice signal and the first attenuated signal and produces a second attenuation control signal in response thereto, the second attenuation control signal controls an attenuation of the second attenuation circuit, wherein the first control section comprises:

a buffer which receives the second attenuated signal, and delays the second attenuated signal with a delay time substantially equal to a time for the second attenuated signal to travel from the second attenuation circuit to the first attenuation circuit through a communication line, thereby producing a delayed second attenuated signal;

a first power estimation section coupled to the buffer, the first power estimation section estimates a power of the delayed second attenuated signal and produces an output in response thereto;

a second power estimation section which receives the first voice signal, estimates a power of the first voice signal and produces an output in response thereto;

a comparator which receives and compares the outputs of the first and second power estimation sections and produces an output in response thereto; and an attenuation amount calculation section which receives the output of the comparator and produces the first attenuation control signal in response thereto.

8. A voice switching system comprising:

a first receiver which receives a first voice signal;

a first attenuation circuit which receives the first voice signal from the first receiver and produces a first attenuated signal;

a first control circuit coupled to the first attenuation circuit;

a second receiver which receives a second voice signal;

a second attenuation circuit which receives the second voice signal from the second receiver and produces a second attenuated signal; and a second control circuit distinct from the first control circuit and coupled to the second attenuation circuit; wherein the first control circuit receives the first voice signal and the second attenuated signal, the first control circuit compares the first voice signal and the second attenuated signal and produces a first attenuation control signal in response thereto, the first attenuation control signal controls an attenuation of the first attenuation circuit; and the second control circuit receives the second voice signal and the first attenuated signal, the second control circuit compares the second voice signal and the first attenuated signal and produces a second attenuation control signal in response thereto, the second attenuation control signal controls an attenuation of the second attenuation circuit, wherein the second control section comprises:

a first power estimation section which receives the second voice signal, estimates a power of the second voice signal and produces an output in response thereto;

a buffer which receives the first attenuation signal, and delays the first attenuated signal with a delay time substantially equal to a time for the first attenuated signal to travel from a speaker connected to the first attenuation circuit to the second receiver, thereby producing a delayed first attenuated signal;

a second power estimation section coupled to the buffer, the second power estimation section estimates a power of the delayed first attenuated signal and produces an output in response thereto;

a comparator which receives and compares the outputs of the first and second power estimation sections and produces an output in response thereto;

an attenuation amount calculation section which receives the output of the comparator and produces the second attenuation control signal in response thereto.

* * * * *